United States Patent

[11] 3,580,387

[72] Inventor Jonathan W. King, Jr.
    Niles, Ohio
[21] Appl. No. 793,372
[22] Filed Jan. 23, 1969
[45] Patented May 25, 1971
[73] Assignee Georgia Pacific Corporation
    Portland, Oreg.

[54] CONVEYOR ARTICLE SUPPORT APPARATUS
    11 Claims, 10 Drawing Figs.
[52] U.S. Cl. .................................................. 198/178,
                                                         198/180
[51] Int. Cl. ........................................... B65g 17/20
[50] Field of Search ........................................ 198/178,
                                                    179, 180; 294/61

[56] References Cited
    UNITED STATES PATENTS
1,864,114   6/1932   Angerpointer ............... 198/179
2,279,686   4/1942   Kerlin ........................... 198/180
3,286,858   11/1966  Julien ........................... 198/179X Primary Examiner—Robert G. Sheridan
Attorney—Oldham & Oldham ABSTRACT: The conveyor article support apparatus relates to a driven conveyor moved through a fixed path and a plurality of hanger means pivotally attached to the conveyor and dependent therefrom, the hanger means including a movable article-piercing means, and control means for the article-piercing means movably positioned in the hanger means and having a control member operatively connected to the control means to move the article-piercing means to and from operative positions. Inclined plane means are fixedly positioned adjacent the conveyor path to engage the control member for moving the article-piercing means to and from operative positions for securing articles to the hanger means.

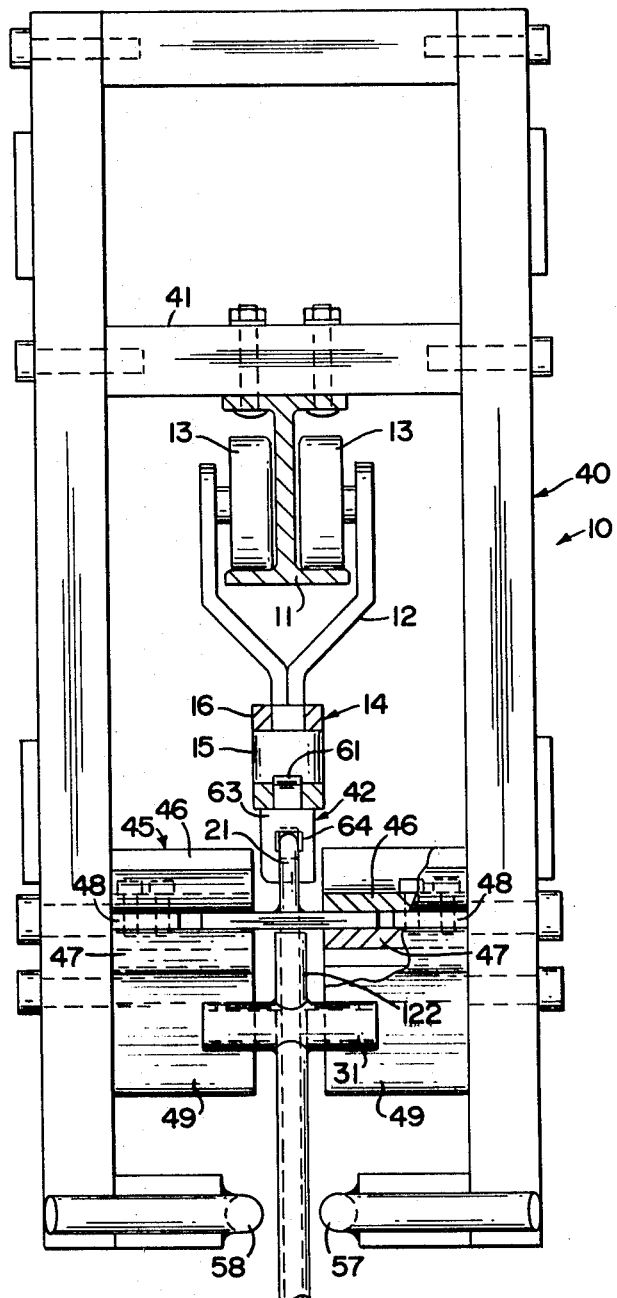
FIG.2
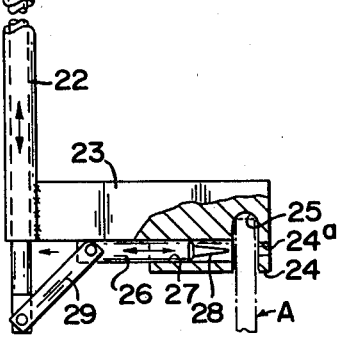
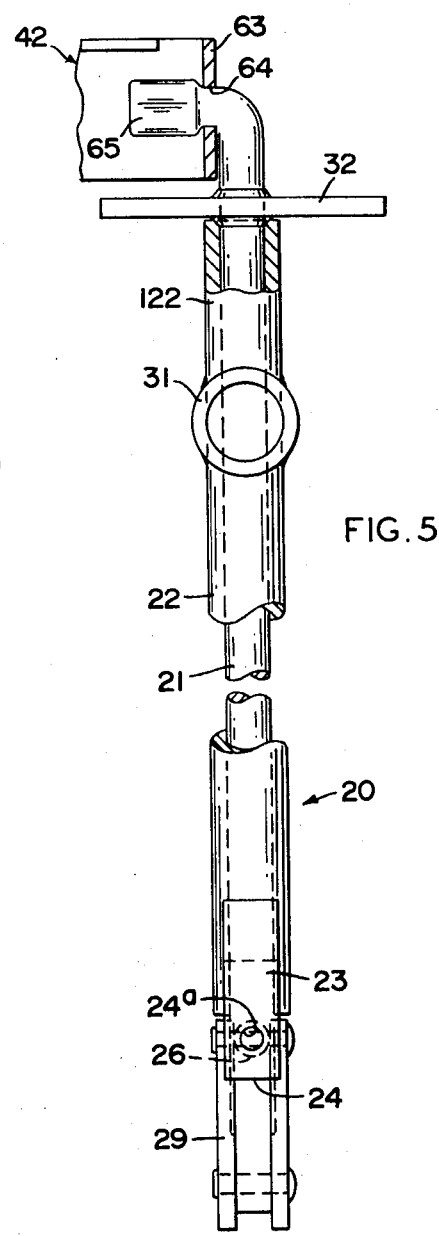
FIG.5
INVENTOR.
JONATHAN W. KING JR.
BY
*Oldham & Oldham*
ATTORNEYS.

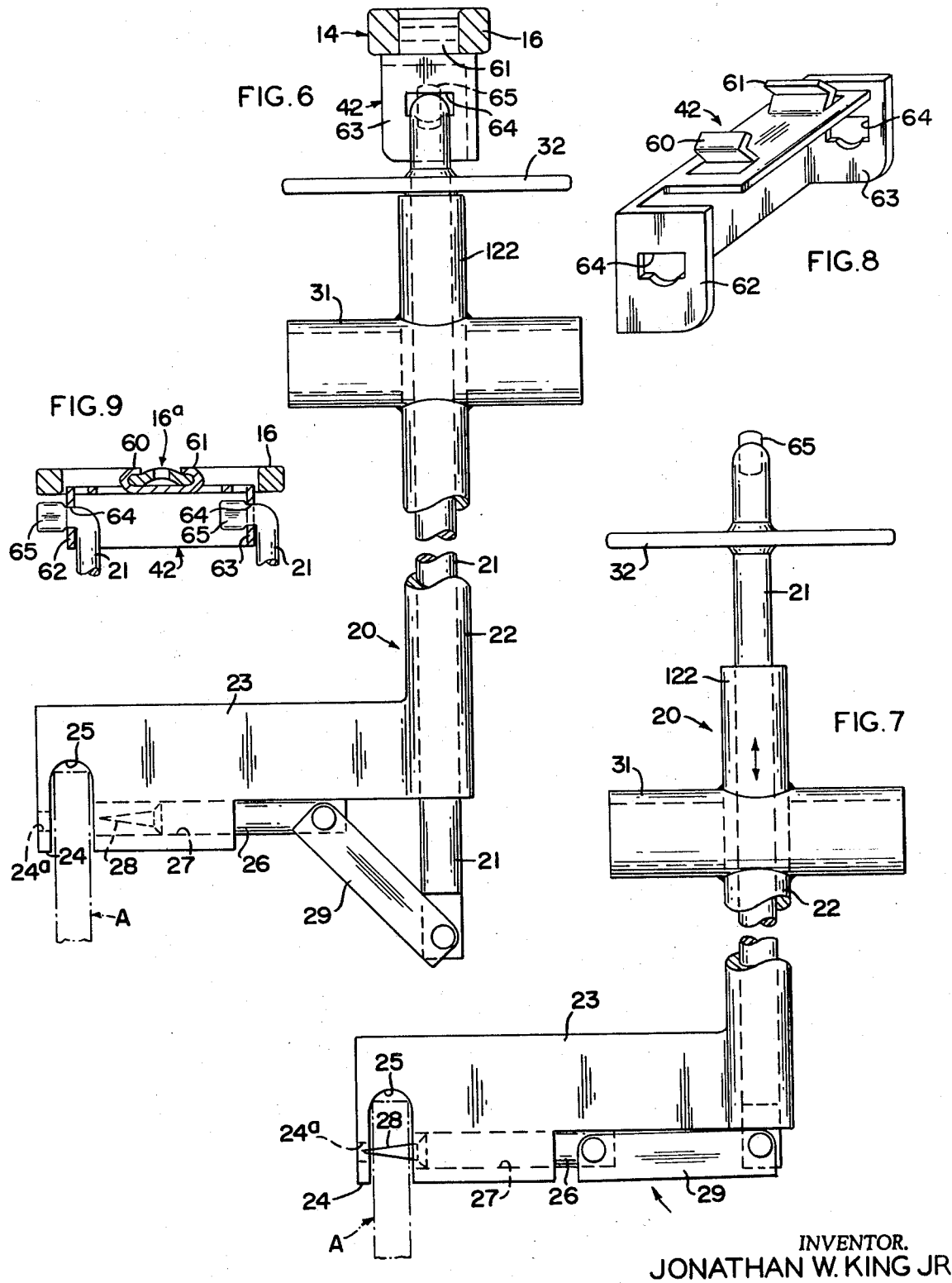

CONVEYOR ARTICLE SUPPORT APPARATUS

The present invention relates to conveyor article support apparatus, and particularly to means associated with, normally, a continuous-driven conveyor for automatically providing an article-engaging and an article-disengaging action by special support means provided on the conveyor for attaching articles thereto, which support apparatus cooperates with fixed inclined plane means for article-engaging or release action.

Heretofore there have been various types of conveyor article hangers or supports provided and which are adapted to be engaged in various manners with articles to be attached to and carried by the conveyor for processing of such articles. One main use of such conveyors having articles attached thereto is for painting the attached articles, but this is merely one examples of the processing to which the articles may be subjected when attached to and carried by a conveyor through a fixed course. In many instances, it is necessary to use a relatively large number of workers to attach articles to the conveyor hangers and then to remove the articles therefrom after processing the articles.

It is the general object of the present invention to provide an improved conveyor article support which, in association with means operatively associated with the conveyor, will provide an automatic article attach or article release action merely by driven movement of the conveyor through a fixed course.

Another object of the invention is to provide a special suspended support or hanger for attachment to a conveyor and have members associated with the article support to provide a positive article-piercing action by a plunger provided in the article support to secure an article positively to the conveyor for movement therewith.

Another object of the invention is to use an inclined plane means in association with special crossmembers attached to an article hanger having relatively movable means therein and wherein the crossmembers will engage the inclined plane means to provide a drive action for a pierce plunger in the hanger when an article is to be engaged therewith and to provide a release action for the plunge as the conveyor is moved past an unload station in the apparatus.

Other objects of the invention are to provide automatic, or substantially automatic apparatus for attaching articles positively to a conveyor article support and for thereafter removing them therefrom; to reduce the amount of worker time required to attach and/or detach articles to a driven conveyor; to provide an improved, positive acting apparatus used for article support in conveyors and whereby a sturdy apparatus is provided that can function with a minimum of maintenance thereon for improved and positive article engagement action; to provide a toggle-type drive action for a piercing plunger in a conveyor article support apparatus; to provide an article support apparatus which normally is positioned by gravity in an operative position; and to provide an article hanger apparatus that is adapted to be moved repeatedly through a conventional painting apparatus with no impairment of the hanger article engagement action.

The foregoing and other objects and advantages of the invention will be made more apparent as the specification proceeds.

Attention now is particularly directed to the accompanying drawings, wherein:

FIG. 2 is an enlarged end elevation, or an enlarged left-side view of the apparatus of FIG. 1 as approaching the load station shown, with portions of the apparatus being broken away and shown in section, and with the apparatus article hanger being in inoperative position;

FIG. 5 is a fragmentary broken away enlarged side view, partially shown in vertical section, of an article hanger means of the invention in its released position as in FIG. 2;

FIG. 6 is a side elevation of the support hanger of FIG. 5;

FIG. 7 is a further side view of the support hanger of FIG. 6 showing it in operative form;

FIG. 8 is a perspective view of an article hanger plate as and provided by the invention for attachment to a chain conveyor or the like;

FIG. 9 is a fragmentary vertical sectional view of the article hanger or support plate of FIG. 8 as attached to a link of a conveyor.

When referring to corresponding members shown in the drawings and referred to in the specification, corresponding numerals are used to facilitate comparison therebetween.

The apparatus of the invention is especially suited for processing elongate, thin metal strips, particularly strips or shapes of a relatively soft metal such as aluminum, and/or articles made from soft metals and usually having a hanger tab thereon.

Figure 1:
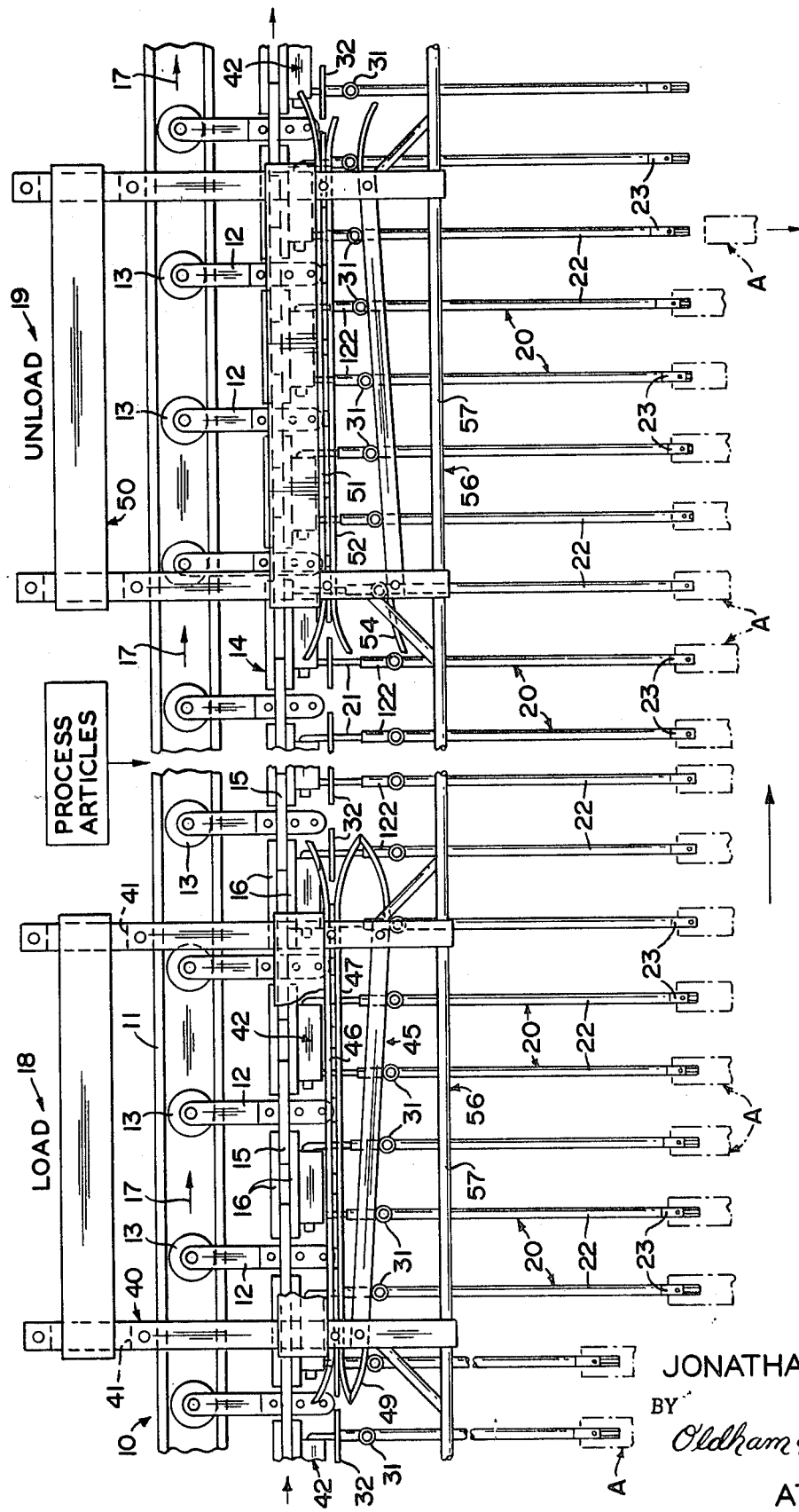
FIG. 1 is a fragmentary side elevation of apparatus, including a portion of an endless conveyor, embodying the principles of the invention.

With particular reference to the details of the structure shown in the accompanying drawings, FIG. 1 shows a conventional conveyor indicated as a whole by the numeral 10. This conveyor 10 includes a support beam or frame such as an I-beam 11 from which a plurality of hanger members 12 are supported in a conventional manner, as by having a pair of rollers 13 attached to the upper ends of each of the hanger members 12 and with an endless chain support conveyor 14 which conveyor is usually made in the form of a plurality of pivotally associated links 15 and 16 so that the conveyor 14 and, in fact, the entire conveyor 10 is positioned for suitable support and movement through a fixed path. Any conventional drive means (not shown) are engaged with the conveyor 10 for moving it in controlled manner through a fixed path only one portion of which is shown in FIG. 1 of the drawings. Thus, the direction of movement of the conveyor 10 is indicated by the arrows 17. A load station 18 is provided after which the conveyor can be moved through any suitable process step or steps indicated diagrammatically in the drawings. Thereafter, the conveyor is moved downstream to an unload station indicated at 19. The I-beam 11 is fixedly positioned by any suitable means and forms a fixed support in the apparatus shown.

As an important feature of the present invention, a plurality of hanger means 20 are provided, usually in uniformly spaced, relatively closely adjacent positions on the continuous link conveyor 14, as indicated in FIG. 1. The hanger means 20, as shown in FIGS. 5—7 of the drawings include a center support rod 21 and a tube 22 slidable positioned on the rod 21. An extension means, or foot member 23 is suitably secured to each of the tubes 22 adjacent the lower end thereof. As indicated, each of the hanger means 20 is pivotally dependent from the conveyor 14. The tube 22 is positioned on the rod 21 intermediate the ends thereof. An anvil 24 is provided in each of the foot portions 23 and it faces inwardly of the foot members 23 with a slot 25, usually extending substantially vertically, extending into the foot section 23 from the lower surface thereof to receive an article to be secured to the individual hanger means. The slots 25 can be of any suitable size but usually are relatively elongate in a vertical direction and relatively short in a horizontal direction.

In order to provide the hanger means 20 with members thereon for positively engaging an article, indicated at A in the drawings, an article-engaging or -piercing member or pin 26 is slidably positioned in a horizontal extending bore provided in a lower portion of the foot section 23 immediately adjacent the slot 25. Usually such foot section 23 has a downwardly extending offset portion in which a bore 27 is provided and with the piercing pin 26 having a tubular body that is slidably received in the bore 27 and has its one end remote from the anvil 24 protruding from the foot section 23 at all times. The pin has a sharp point 28 for article-piercing or -engaging action. The pin 26 is adapted for sliding movement to and from operative engagement with any article positioned in the slot 25. Usually an aperture 24a is provided in the anvil for receiving the end of the pin 26 when it has been forced to a fully operative position, as hereinafter described.

So as to control the positioning of the pin 26, a toggle link 29 is pivotally secured to and extends between the lower end of the center support rod 21 and the end of the body remote from the sharpened pin 28 of such article-piercing member. FIG. 6 of the drawings indicates the position of the pin 26 when it is in its retracted position and FIG. 7 indicates the pin in its article-piercing position.

Another important feature of the present invention resides in the particular control means provided for such article-piercing or -engaging pin 26 and preferably a sturdy cylindrical member, such as a metal tube or pipe 31 is suitably secured to the tube 22 adjacent but spaced from the upper end of such tube. Thus the cross tube 31 is provided for certain control functions as hereinafter described. The upper end of the center support rod 21 also has a control means or arm section attached thereto and in this instance a cross plate 32 is suitably secured, as by welding to the upper end of the support rod 21 spaced a short distance downwardly from the conveyor 14. Both the cross tube 31 and plate 32 are positioned in planes or on axes perpendicular to the longitudinal axis of the individual hanger means 20.

Reference now is made to certain inclined plane means best shown in FIGS. 1, 2, 3 and 4 of the drawings and wherein the inclined plane means are provided to engage the control means for the article-piercing pin and particularly the cross tube 31 and plate 32 for controlling the operative positioning of the different components in the individual hanger means and for providing the desired positive article attachment or disengaging action. Specifically, in FIG. 2, a frame 40 is provided that is attached to and straddles the I-beam 11, as by a crossbar 41. The frame 40 thus has sections positioned on opposite sides of the I-beam 11. FIG. 2 indicates that the individual hanger means 20 are secured to the conveyor 14 by support plates 42 that operatively engage the conveyor 14 as hereinafter described. In the apparatus shown, each of the support plates 42 pivotally engages and supports a pair of the hanger means 20 at longitudinally spaced portions of the support plates each of which has a longitudinal axis coinciding with that of the conveyor 14. FIG. 2 of the drawings brings out that the dependent hanger means 20 are moved by the conveyor 14 between pairs of spaced control members provided to regulate article-engaging and release action in the apparatus.

Figure 3:
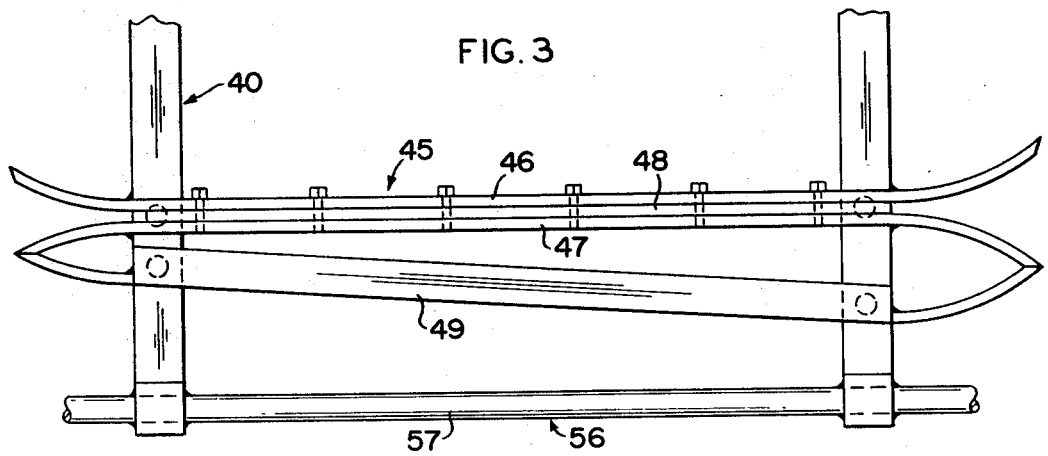
FIG. 3 is a fragmentary enlarged elevation of a portion of the apparatus at the load station.
Figure 4:
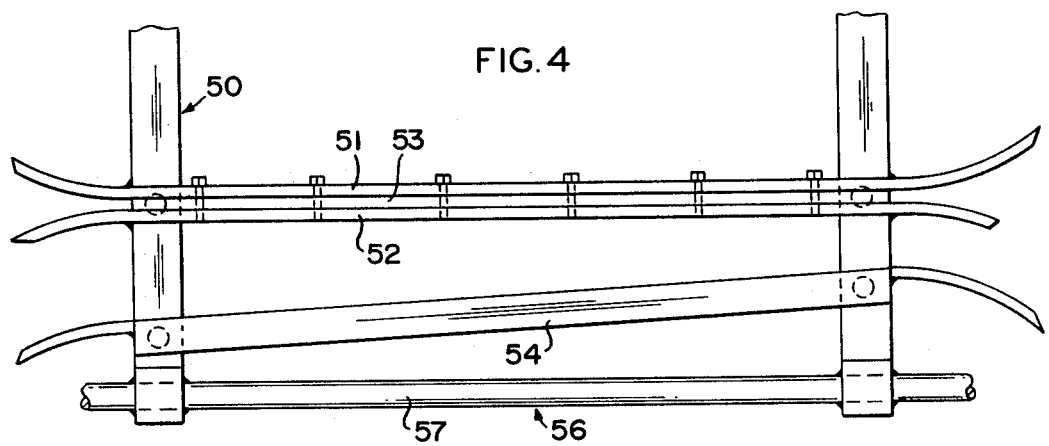
FIG. 4 is an enlarged elevation of a portion of the apparatus at the article unload station.

In FIG. 3 of the drawings, one set of inclined plane means indicated as a whole by the numeral 45 is shown. These inclined plane means 45 include a pair of upper plates or bars 46 and 47 that are secured to the one side of the frame 40 in a conventional manner and have a narrower spacer plate 48 positioned therebetween whereby the bars or plates 46 and 47 are slightly spaced in a vertical direction and protrude in towards the conveyor 14 from the spacer plate 48. FIG. 3 shows that the upper bar or plate 46 has upwardly inclined portions at each end thereof whereas the lower bar 47 has downwardly inclined portions or sections at each end thereof but that the spacer bar or plate 48 provides an edge opening between the two spaced bars 46 and 47 which space or opening is horizontal whereby when the driven conveyor is moved so as to move one of the hanger means into engagement with this particular unit 45, the cross plate 32 on the individual hanger means will be automatically brought into engagement with the space provided between the bars 46 and 47 and move it along in a horizontally positioned path while retaining such cross plate or means 32 and thus the center support rod 21 to which it is secured in a fixed vertical position. Similar sets of the bars or plates 46, 47 and 48 are provided on each side of the conveyor 14. The control action for the article-piercing or -engaging pin 32 is provided by the fact that a third plate or bar 49 is present in the inclined plane means 45 which plate or bar is suitably secured to the frame 40 and is positioned to be inclined, or extend downwardly of the frame 40 with downstream movement of the conveyor 14. Usually the upstream end of the lowest plate 49 is upwardly inclined and may abut against the downwardly inclined leading end of the lower bar 47 as indicated in the drawings. In all events, the cross tube or control member 31 is adapted to engage with the lower surface of this lowest plate or bar 49 and such cross tube 31, by driven or powered movement of the conveyor along its path, will thus be moved downwardly. Such action will move the tube 22 from the inoperative position shown in FIG. 6 to the operative position shown in FIG. 7 wherein the pin 26 has been moved to an article-piercing or -engaging position in the apparatus and an article A has been attached to the individual hanger means.

Prior to the individual hanger means being moved through the load station 17, a worker, not shown, has manually positioned the upper end of one of the articles A in the slot 25 provided in the foot section 23. The normal position of the hanger means by gravity action is such that the pin 26 will move up and at least engage the article A to retain it in position until external forces are applied to the controls for the hanger means. In other words, the tube 22 and associated means is just supported by gravity on the center rod 21 so that the normal operative position of the hanger means is that shown in FIG. 7, or the pin 26 is urged towards such position. Hence all a worker needs to do is to lift the tube 22 a short distance along the center support rod 21 and this withdraws the pin 26 from the operative position shown whereby when the worker sticks an article into the slot 25 and then releases the tube, the pin end 28 engages the article with sufficient friction to retain the article in a given position while the conveyor is being moved forwardly through its fixed path.

The angle of divergence of the lower plate 49 to the horizontal may be any suitable degree, it has been found that relatively small angles, such as from about 3½° to about 7°, have been used in different tests of the apparatus of the invention. Successful test results have been secured with control bars of these degrees of divergence from the horizontal for the unit shown at the load station 17.

From the load station, then the entire conveyor means 10 can be driven to or moved through any desired process steps to which the articles A would be subjected, such as spray painting or other action, and then when the article is ready to be removed from the conveyor means 10, the conveyor moved to and through the unload station 19 as shown. In this instance, again a frame means 50 is provided that secures a pair of spaced upper plates 51 and 52 on the frame means 50 on each side of the I-beams 11 and with such upper plates 51 and 52 being positioned to define a horizontally directed opening or space therebetween by means of a spacer plate 53 provided between these plates so that the plate 32 on the support rod will again engage the bars or plates 51 and 52 and be guided in a horizontal path therebetween. At the same time, relative movement between the tube 22 and the center support rod 21 is provided by a lowermost plate 54 that is likewise secured to the frame 50 on each side of the apparatus. In this instance, the lowermost plate 54 is upwardly inclined in the apparatus at usually substantially the same angle as the plate 49 is inclined downwardly in the apparatus. The upper surface of lowermost plate 54 then engages the cross tube 31 as the individual hanger means are drawn along in the apparatus and this forces the tube 22 upwardly of the center support rod to the position indicated in FIG. 6 at which time the pin 26 has been withdrawn from the article A and the article A can be permitted to drop into any suitable conveyor, chute means, or a hopper or the like, or the articles can be manually engaged and placed in any suitable receiver or treated in any manner for further processing, storage or other action as is desired.

Figure 10:
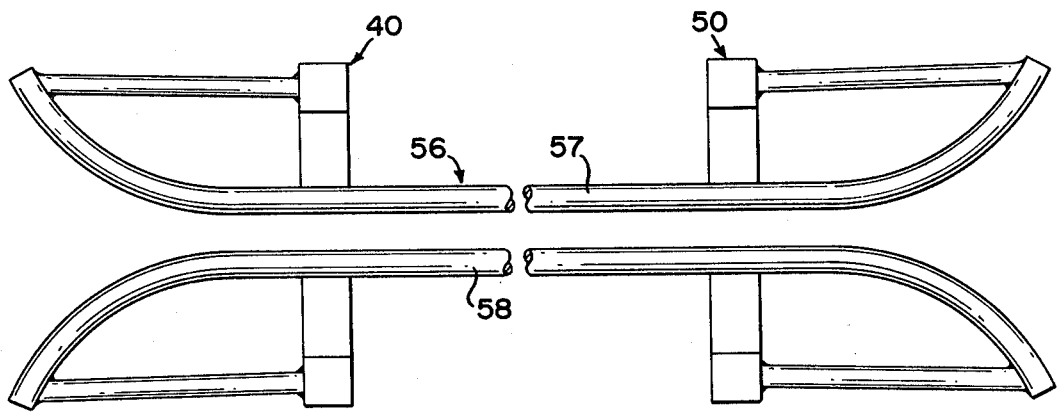
FIG. 10 is a fragmentary bottom plan of a portion of the guide means at the article load or unload station.

In order to facilitate the hanger means 20 moving into and through the frame means 40 and 50 at the load and unload stations, preferably suitable guide means 56 is provided and is suitably secured to each of these frames. FIG. 10 best shows that a pair of opposed side guides 57 and 58 are attached to these frame means and define a longitudinal extending opening in the lower portion of the apparatus associated with each of these frames. Usually the ends of the guides diverge or flair outwardly to facilitate positive engagement of each of the hanger means with the guides to lead them through the frame means 40 and 50 at the center portions thereof.

FIGS. 8 and 9 best show certain details of the support plates 42 used to attach a pair of hanger means pivotally to the conveyor 14. In this instance, each of the support plates 42 has a pair of lugs 60 and 61 thereon which are brought into suitable mechanical engagement with a center portion 16a of each of the bottom links 16 and the conveyor 14. The conveyor is made, for example, from an endless chain formed by pairs of the links 16 being suitably spaced and pivotally engaged to each of the ends of the connecting links 15 on the top and bottom thereof. At the ends of the support plates 42, flanges 62 and 63 are provided with suitable keyhole or elongate aperture 64 being present in each of these flanges. The upper ends of each of the center support rods 21 is flattened as indicated at 65 to form a vertical lug thereon whereby the flattened ends 65 are adapted to be inserted through the keyhole-shape type of aperture 64 when the flattened section 65 is turned to be horizontally directed for insertion in the aperture 64 after which the hanger means can be permitted to rotate through about 90° and take the dependent position as shown in the drawings. Then each of the center support means or rods is pivotally engaged with one of the support plates and can only be detached therefrom when moved to approximately an arc of 90° and being moved or pulled away from the flanges 62 and 63. The support plates 42 with the continuous sidewall thereon form sturdy support means in the apparatus.

To limit the retraction movement of the pin 28, the tube 22 has an upper stop section 122 above the tube 31.

From the foregoing, it is believed that a practical, substantially automatic means has been provided to attach articles to a conveyor for processing action. The components of the hanger means are not impaired by repeated passages through paint spray apparatus. The article-engaging means are positively controlled for article-engaging and article release action. Hence, the objects of the invention are achieved.

While one complete embodiment of the invention has been disclosed herein, it will be appreciated that modification of this particular embodiment of the invention may be resorted to without departing from the scope of the invention as defined in the appended claims.

I claim:

1. Conveyor article support apparatus including a driven conveyor positioned for movement on a fixed path and a plurality of hanger means pivotally attached to said conveyor and dependent therefrom, the improvement comprising:
    said hanger means including a movable article-engaging means;
    said hanger means also including a center rod, a tube slidably carried by said center rod on an intermediate portion thereof, a foot member secured to and protruding from said tube at its lower end and having an anvil at an end thereof, said movable article-engaging means including an engaging member slidably carried by said foot member, and a link means pivotally connecting between the lower end of said center rod and said engaging member to move it to and from engagement with said anvil on relative movement of said tube and center rod;
    control means for said article-engaging means movably positioned in said hanger means and a control member operatively connected to said control means; and
    inclined plane means fixedly positioned adjacent said conveyor path to engage said control member as said driven conveyor moves through its path to actuate said control means and move said article-engaging means to operative position.

2. Apparatus as in claim 1 where a second inclined plane means is positioned downstream of said first-named inclined plane means to engage said control member on movement of said conveyor along its fixed path and move said article-engaging means to a retracted article release position whereby automatic article-engaging and release actions are provided as said conveyor is moved along its fixed path.

3. Apparatus as in claim 2 where each of said inclined plane means includes an inclined member and a horizontal positioned guide slot member, and a pair of said control members are provided on each of said hanger means to engage, individually, one of said members of said inclined plane means to control the relative positions of said tube and said center rod.

4. Conveyor article support apparatus including a driven conveyor positioned for movement on a fixed path and hanger means pivotally attached to said conveyor and dependent therefrom, the improvement comprising:
    said hanger means including a movable article-engaging means positionable in operative association with another portion of the hanger means for article-engaging action, a center support member, a tubular support member slidably engaging said center support member, one of said support members operatively engaging said article-engaging means and the other said support member operatively engaging said another portion of the hanger means;
    a control member for each of said support members and extending laterally therefrom; and
    means including inclined plane means fixedly positioned adjacent said conveyor path to engage said control members as said driven conveyor moves through its path to control the positions of said support members and move said article-engaging means to operative article-engaging position.

5. Apparatus as in claim 4 where a second means including an inclined plane means is positioned downstream of said first-named means including an inclined plane means to engage said control members on movement of said conveyor and move said article-engaging means to a retracted article release position.

6. Apparatus as in claim 5 where each of said inclined plane means includes an inclined member and means forming a horizontally positioned guide slot member, said control members engaging, individually, one of said members of said inclined plane means to control the relative positions of said support members.

7. Apparatus as in claim 1 where said control means includes a crossmember for each of said center rod and said tube secured thereto adjacent the upper ends thereof and extending therefrom to engage said inclined plane means.

8. Conveyor article support apparatus including a driven conveyor positioned for movement on a fixed path, and a plurality of hanger means pivotally attached to said conveyor and dependent therefrom, the improvement comprising:
    said hanger means including a center support rod, a tube slidably carried by said center rod on an intermediate portion thereof, a foot member secured to and protruding from said tube at its lower end and having an anvil on a recessed end thereof, a piercing member slidably carried by said foot member, and a link means pivotally connecting between the lower end of said center rod and said piercing member to move it to and from engagement with said anvil on relative movement of said tube and center rod;
    control means for said piercing member extending from said center support rod; and
    inclined plane means fixedly positioned adjacent said conveyor path to engage said control means as said driven conveyor moves through its path to actuate said link means and move said article-piercing means to operative position in association with said anvil.

9. Apparatus as in claim 8 where a second inclined plane means is positioned downstream of said first-named inclined plane means to engage said control member on movement of said conveyor and move said article-piercing means to a retracted article release position.

10. Apparatus as in claim 8 where said control means includes a crossmember for each of said center support rod and said tube secured thereto adjacent the upper ends thereof and extending therefrom to engage said inclined plane means, each of said inclined plane means including a pair of inclined plane members positioned at acute angles to each other.

11. Apparatus as in claim 1 where said article-engaging means comprises a piercing pin, and said control means includes a toggle link for forceful movement of said pin to and from engagement with an article associated with said hanger means.